(12) United States Patent
Wu et al.

(10) Patent No.: US 8,897,974 B2
(45) Date of Patent: Nov. 25, 2014

(54) GEAR SELECTOR SYSTEM

(75) Inventors: Peter E. Wu, Lake Forest, CA (US); Richard E. Robinette, Grosse Pointe Woods, MI (US); Mark A. Vernacchia, Northville, MI (US); Jack P. Koski, South Lyon, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 551 days.

(21) Appl. No.: 12/795,428

(22) Filed: Jun. 7, 2010

(65) Prior Publication Data
US 2011/0296942 A1   Dec. 8, 2011

(51) Int. Cl.
| | | |
|---|---|---|
| *G06F 7/00* | (2006.01) | |
| *G06F 17/00* | (2006.01) | |
| *G06F 19/00* | (2011.01) | |
| *B60K 20/00* | (2006.01) | |
| *G05G 5/00* | (2006.01) | |
| *F16H 59/10* | (2006.01) | |
| *F16H 61/24* | (2006.01) | |
| *F16H 59/04* | (2006.01) | |

(52) U.S. Cl.
CPC ........ *F16H 59/105* (2013.01); *F16H 2061/243* (2013.01); *F16H 2059/047* (2013.01)
USPC ................ 701/51; 701/54; 701/55; 74/473.1; 74/473.25

(58) Field of Classification Search
None
See application file for complete search history.

(56) References Cited

U.S. PATENT DOCUMENTS

| | | | | | |
|---|---|---|---|---|---|
| 3,989,906 | A | * | 11/1976 | Kiko | 379/346 |
| 4,208,925 | A | * | 6/1980 | Miller et al. | 477/63 |
| 4,339,801 | A | * | 7/1982 | Hosaka et al. | 701/102 |
| 4,519,266 | A | * | 5/1985 | Reinecke | 74/471 XY |
| 5,191,178 | A | * | 3/1993 | Baker | 200/61.88 |
| 5,218,298 | A | * | 6/1993 | Vig | 324/251 |
| 5,307,013 | A | * | 4/1994 | Santos et al. | 324/207.2 |
| 5,370,015 | A | * | 12/1994 | Moscatelli | 74/335 |
| 5,561,416 | A | * | 10/1996 | Marshall et al. | 340/456 |
| 5,640,511 | A | * | 6/1997 | Botzenhardt et al. | 714/57 |
| 5,844,411 | A | * | 12/1998 | Vogt | 324/537 |
| 6,339,325 | B1 | * | 1/2002 | Oda et al. | 324/207.2 |
| 6,353,399 | B1 | * | 3/2002 | Prakash et al. | 341/10 |
| 6,376,929 | B1 | * | 4/2002 | Nakajima | 307/10.1 |
| 6,382,045 | B1 | * | 5/2002 | Wheeler | 74/473.12 |
| 6,550,351 | B1 | * | 4/2003 | O'Reilly et al. | 74/335 |
| 7,242,329 | B2 | * | 7/2007 | Katrak | 341/97 |
| 7,844,376 | B2 | * | 11/2010 | Brunstetter | 701/34.4 |
| 8,044,787 | B2 | * | 10/2011 | Katrak et al. | 340/456 |

(Continued)

*Primary Examiner* — Calvin Cheung
*Assistant Examiner* — Krishnan Ramesh

(57) ABSTRACT

A gear selector assembly for selecting a gear position of a transmission includes an internal mode switch having detent lever, a plurality of magnetic field sensors, a control module, a first power supply and a second power supply. The detent lever has a plurality of detents and a magnetized track, where the magnetized track includes a plurality of magnetized elements that are indicative of a particular gear selector position. The magnetic field sensors are associated with each of the magnetized elements for sensing changes in a magnetic field of the magnetized track. The control module is in communication with each of the field sensors. Each of the field sensors sends an output current to the control module and the value of the output current is variable. The value of the output current is indicative of at least one of the following: the direction of the magnetic field from the corresponding magnetic track, a short circuit, and an open circuit.

20 Claims, 5 Drawing Sheets

(56) References Cited

U.S. PATENT DOCUMENTS

| | | | |
|---|---|---|---|
| 8,069,395 B2* | 11/2011 | Deierling et al. | 714/759 |
| 8,204,712 B2* | 6/2012 | Katrak | 702/150 |
| 2003/0191546 A1* | 10/2003 | Bechtel et al. | 700/19 |
| 2005/0030009 A1* | 2/2005 | Moreno | 324/207.11 |
| 2005/0126322 A1* | 6/2005 | Kozaki et al. | 74/335 |
| 2005/0172746 A1* | 8/2005 | Waldow et al. | 74/473.18 |
| 2006/0173942 A1* | 8/2006 | Katrak | 708/200 |
| 2006/0242537 A1* | 10/2006 | Dang | 714/763 |
| 2006/0244570 A1* | 11/2006 | Leung et al. | 340/310.11 |
| 2007/0290701 A1* | 12/2007 | Nguyen | 324/757 |
| 2008/0028879 A1* | 2/2008 | Robinette et al. | 74/335 |
| 2008/0065290 A1* | 3/2008 | Breed et al. | 701/29 |
| 2008/0065299 A1* | 3/2008 | Brunstetter | 701/51 |
| 2008/0276738 A1* | 11/2008 | Kozaki et al. | 74/335 |
| 2008/0288135 A1* | 11/2008 | Katrak et al. | 701/33 |
| 2009/0102461 A1* | 4/2009 | Santos et al. | 324/207.2 |
| 2009/0144002 A1* | 6/2009 | Zettel et al. | 702/64 |
| 2009/0181818 A1* | 7/2009 | Pinkos | 475/150 |
| 2009/0320633 A1* | 12/2009 | Knysch | 74/473.3 |
| 2010/0085178 A1* | 4/2010 | Katrak et al. | 340/456 |
| 2011/0289390 A1* | 11/2011 | Mayhew | 714/777 |
| 2011/0296942 A1* | 12/2011 | Wu et al. | 74/473.12 |

* cited by examiner

Sensor Bit Pattern Fault Analysis

| IMS | | | | | |
|---|---|---|---|---|---|
| Normal State | | PRNDLx | | | |
| | | S R1 R2 D1 D2 | | | |
| Selector | Transition(s) Completed | Bit Pattern | Bit Value | Indicated | Predicted |
| P | | 10101 | 21 | P | P |
| P-R | R1: 0 to 1 | 11101 | 29 | Trans_2 | NP |
| P-R | R1: 0 to 1 & S: 1 to 0 | 01101 | 13 | Trans_18 | NP |
| R | | 01001 | 9 | R | R |
| R-N | D1: 0 to 1 | 01011 | 11 | Trans_20 | ECC R |
| R-N | D1: 0 to 1 & S: 1 to 0 | 11011 | 27 | Trans_4 | ECC N |
| N | | 11010 | 26 | N | N |
| N-D | R2: 0 to 1 | 11110 | 30 | Trans_1 | ECC N |
| N-D | R2: 0 to 1 & S: 1 to 0 | 01110 | 14 | Trans_17 | ECC D |
| D | | 00110 | 6 | D | D |
| L | S: 0 to 1 | 10110 | 22 | M | M |

*Fig-7A*

| | R1 | D1 | R2 | D2 |
|---|---|---|---|---|
| Park | 0 | 0 | 1 | 1 |
| Reverse | 1 | 0 | 0 | 1 |
| Neutral | 1 | 1 | 0 | 0 |
| Drive | 0 | 1 | 1 | 0 |

*Fig-7B*

GEAR SELECTOR SYSTEM

FIELD

The present disclosure relates to a gear selector assembly, and in particular to a gear selector assembly having an internal mode switch including a plurality of magnetic field sensors that correspond to a particular gear selector position.

BACKGROUND

The statements in this section merely provide background information related to the present disclosure and may or may not constitute prior art.

A gear selection assembly includes a shifting lever that is actuated to select a desired gear selector position such as Park, Reverse, Neutral, or Drive. In a drive-by-wire system, the position of the shifting lever is converted into an electronic signal, and the electrical signal is communicated to the transmission by an internal mode switch. The internal mode switch module includes a detent lever having a plurality of detents, where each detent corresponds to a gear selector position. Magnetic field sensors such as Hall effect sensors can be used to detect the position of the detent lever. In one example, the Hall sensors are the three-lead type, where a first lead serves as a connection to ground, a second lead is connected to a voltage supply, and a third lead carries an output voltage. In this approach, a first set of Hall sensors communicate with one of the control modules, and a second set of Hall sensors communicate with the other control module. One of the Hall sensors from the first set of sensors and the second set of sensors are associated with each detent of the detent lever, which means that two different Hall sensors are used to monitor each detent of the detent lever.

The signals from the first set and the second set of Hall sensors are compared against one other in an effort to determine if each set of sensors are sending an accurate signal. However, this approach is redundant, as multiple control modules are needed to process the signals from the Hall sensors. Moreover, this approach can also be costly, as there are typically numerous Hall sensors used to determine the position of the shifting lever. In one example, nine different Hall sensors are needed in a gear selector assembly having five different gear lever positions (i.e., Park, Neutral, Reverse, Drive and Low gear).

While gear shifter assemblies achieve their intended purpose, there is a need for a new and improved gear shifter assembly which exhibits improved performance from the standpoint of reducing the number of magnetic field sensors used and processor redundancy.

SUMMARY

The present invention provides a gear selector assembly for selecting a gear position of a transmission, including an internal mode switch having a detent lever, a plurality of magnetic field sensors, a control module, and a first and second power supply. The detent lever has a plurality of detents and a magnetized track. The magnetized track includes a plurality of magnetized elements that are indicative a particular gear selector position based on the direction of a magnetic field, and each detent corresponds to one of the gear selector positions. The detent lever is rotatable to select one of the desired gear selector positions. The magnetic field sensors are associated with each of the magnetized elements for sensing changes in the magnetic field of the magnetized track, where each field sensor corresponds to one of the magnetized elements of the magnetized track. The control module is in communication with each of the field sensors, where each of the field sensors sends an output current to the control module and the value of the output current is variable. The value of the output current is indicative of at least one of the following: the direction of magnetic field from the corresponding magnetic track, a short circuit, and an open circuit. The first power supply and the second power supply provide power to the field sensors, where a portion of the field sensors are powered by the first power supply and the remaining field sensors are powered by the second power supply.

In an embodiment of the present invention, the control module includes a control logic for converting the output current to an output voltage.

In another embodiment of the present invention, the control module includes a control logic for translating the output voltage of each field sensor to a binary bit value, and a bit pattern indicating the gear selector position is created.

In yet another embodiment of the present invention, the bit pattern includes five bits that each have a binary value of either 0 or 1, and wherein the five bits are S, R1, R2, D1 and D2.

In an embodiment of the present invention, if the value of the output current indicates one of a short circuit and an open circuit for one of the five bits, the control module includes a control logic for substituting the complement of the binary value for the corresponding bit.

In another embodiment of the present invention, the field sensors corresponding to the bits R1 and D1 are powered by the first power supply and the field sensors corresponding to the bits S, R2 and D2 are powered by the second power supply.

In another embodiment of the present invention, a complementary bit is substituted if one of the bits corresponds to a field sensor that has a known electrical fault.

In an embodiment of the present invention, the control module includes an error correction logic and a plurality of predefined bit patterns, and wherein the error correction logic corrects the bit pattern if one and only one of the bits of the bit pattern is different from one of the predefined bit patterns.

In yet another embodiment of the present invention, the binary values for the bits R1 and D1 are complementary to the binary values for the bits R2 and D2.

In an embodiment of the present invention, the binary values for the bits R1, D1, R2, and D2 are 0011 respectively for a Park gear selector position.

In another embodiment of the present invention, the binary values for the bits R1, D1, R2, and D2 are 1001 respectively for a Reverse gear selector position.

In yet another embodiment of the present invention, the binary values for the bits R1, D1, R2, and D2 are 1100 respectively for a Neutral gear selector position.

In an embodiment of the present invention, the binary values for the bits R1, D1, R2, and D2 are 0110 respectively for a Drive gear selector position.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 7A is an illustration of an exemplary sensor bit pattern fault analysis chart that is included with the control module illustrated in FIG. 1; and FIG. 7B is an exemplary illustration of a complementary bit pattern chart.

DETAILED DESCRIPTION

The following description is merely exemplary in nature and is not intended to limit the present disclosure, application, or uses.

Figure 1:
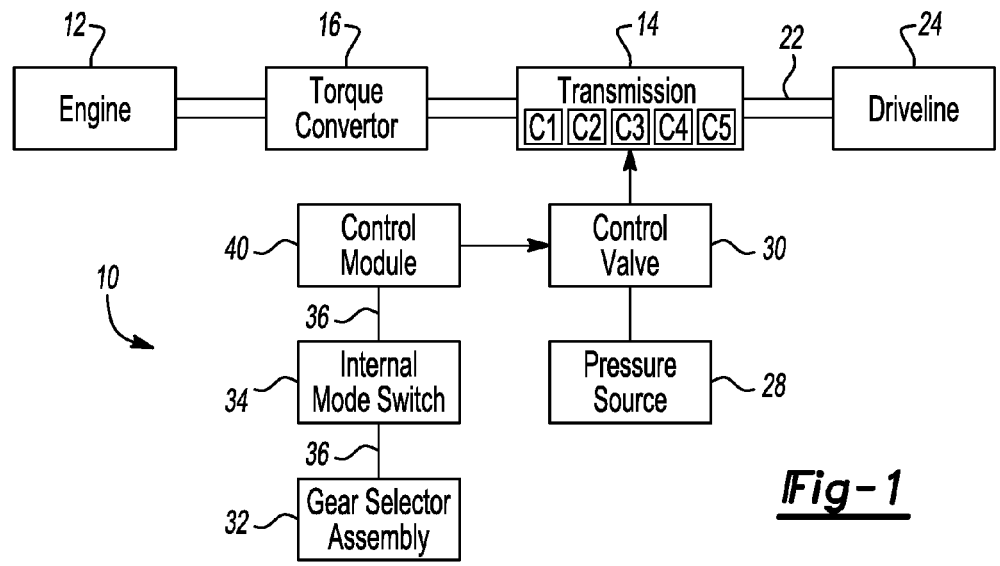
FIG. 1 is a block diagram of an exemplary vehicle including a gear selector assembly and a control module.

With reference to FIG. 1, an exemplary block diagram of a vehicle is shown generally as reference number 10. The vehicle 10 includes an engine 12 that drives a transmission 14 through a torque converter or other torque transmitting device 16. The transmission 14 drives an output shaft 22 based on engine torque, and the output shaft 22 drives a driveline of the vehicle 10. In the embodiment as illustrated, the speed and torque relationship between the engine 12 and the driveline 24 are controlled by hydraulically actuated torque transmitting devices such as clutches C1, C2, C3, C4 and C5 of the transmission 14. The clutches C1-C5 are coupled to a hydraulic pressure source 28 through a control valve 30, which regulates clutch pressure. Although FIG. 1 illustrates five clutches included with the transmission 14, those skilled in the art will appreciate that any number of clutches may be used as well. Moreover, although FIG. 1 illustrates an internal combustion engine, those skilled in the art will appreciate that the transmission 14 may also be employed with hybrid vehicle, where electrical machines can be used either in conjunction with or in place of the engine 12.

A gear selector assembly 32 allows for an operator to set the transmission 14 at a desired gear selector position such as, for example, Park, Neutral, Reverse, and one or more drive positions. The gear selector assembly 32 is in communication with an internal mode switch 34. The internal mode switch 34 is an electrical switch assembly that is used to relay data signals that represent an operator's selected gear position to a control module 40 of the vehicle 10. The control module 40 is preferably an electronic control device having a preprogrammed digital computer or processor, control logic, memory used to store data, and at least one I/O peripheral. The control logic includes a plurality of logic routines for monitoring, manipulating, and generating data. In one embodiment, the control module 40 is the transmission control module (TCM) of the vehicle 10.

The gear selector assembly 32 is in communication with the internal mode switch 34, and the internal mode switch 34 is in communication with the control module 40 by a plurality of data links 36. The data link 36 may be any type of electrical communication interface, such as, for example, data communication lines. Based on the electronic data signals sent from the internal mode switch 34, the control module 40 determines the intended range and controls transmission shift patterns based on the intended range by controlling the control valve 30. Further, the control module 40 can detect a fault based on the signals sent from the internal mode switch 34.

Figure 2:
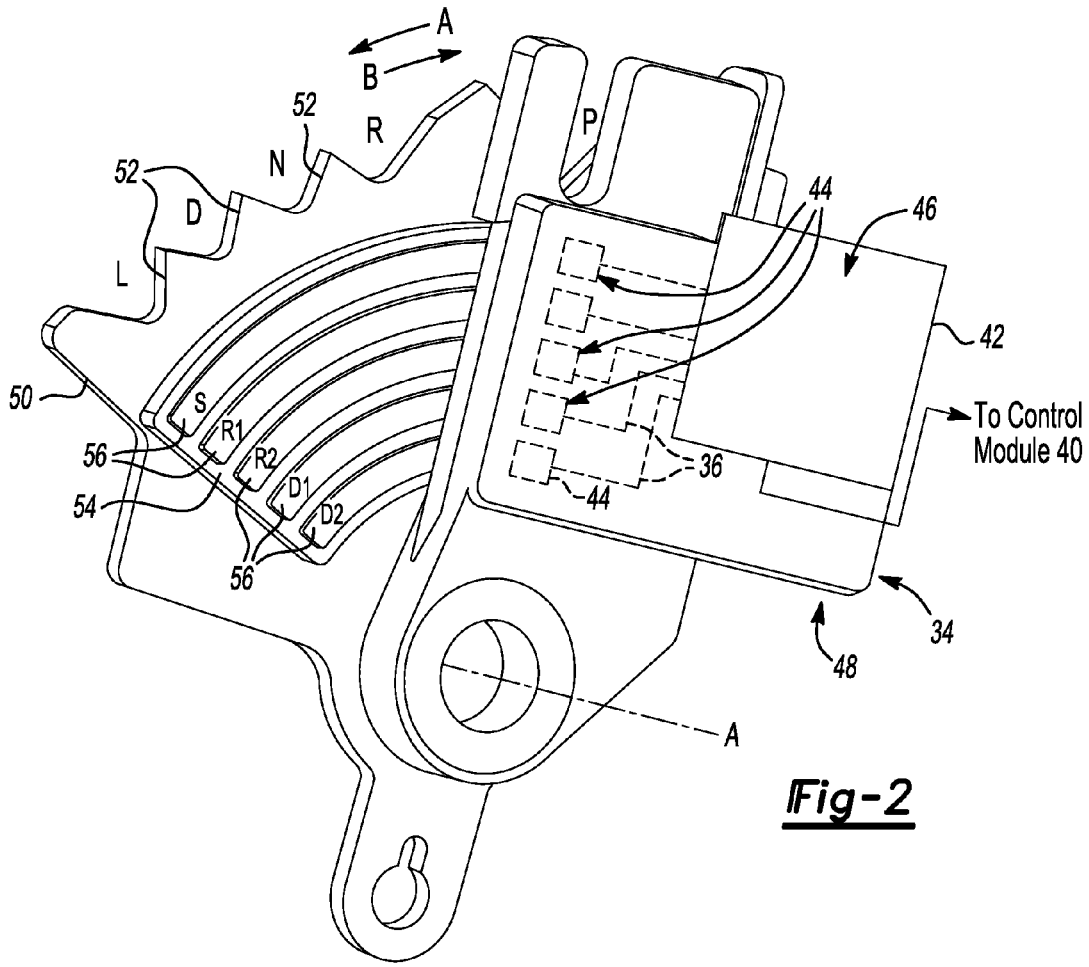
FIG. 2 is an illustration of the internal mode switch shown in FIG. 1, where the internal mode switch includes a magnetized track and a plurality of magnetic field sensors.

FIG. 2 is an illustration of the internal mode switch 34. The internal mode switch 34 includes a housing 42 that contains a plurality of magnetic field sensors 44 that are in electrical communication with an electrical connector 46 through the data links 36. The electrical connector 46 of the internal mode switch 34 is in communication with the control module 40 (FIG. 1). The housing 42 includes a potted area 48 that houses the magnetic field sensors 44. The magnetic field sensors 44 are any type of sensor that is capable of detecting the proximity of a magnetic field, such as, for example, a Hall effect sensor. The internal mode switch 34 includes a detent lever 50 that is rotatable back and forth about an axis A-A. Specifically, the detent lever 50 rotates about the axis A-A as an operator selects a desired gear position. The detent lever 50 includes a plurality of detents 52 that each correspond to a gear selector position. The gear selector position can also be referred to a range selection position. In the embodiment as illustrated, the detent lever 50 includes five gear selector positions (Park (P), Reverse (R), Neutral (N), Drive (D), and Low (L)), however it is understood that other gear selector positions may be used as well.

The detent lever 50 also includes a magnetized track 54. The magnetized track 54 includes a plurality of magnetized elements 56 that are employed to identify a particular gear selector position. Each of the magnetic field sensors 44 corresponds to one of the magnetized elements 56. In the embodiment as shown, the magnetized track 54 includes five magnetized elements that each correspond to one of the five gear selector positions (Park, Reverse, Neutral, Drive and Low gear). The magnetized track 54 is positioned directly underneath the magnetic field sensors 44 such that as the detent lever 50 rotates about the axis A-A, each of the magnetized elements 56 of the magnetized track 54 emits a magnetic field that is detected by the individual field sensors 44. The magnetic field that is emitted by the magnetic elements 56 generates a distinctive output that corresponds to one of the gear selector positions.

Figure 3:
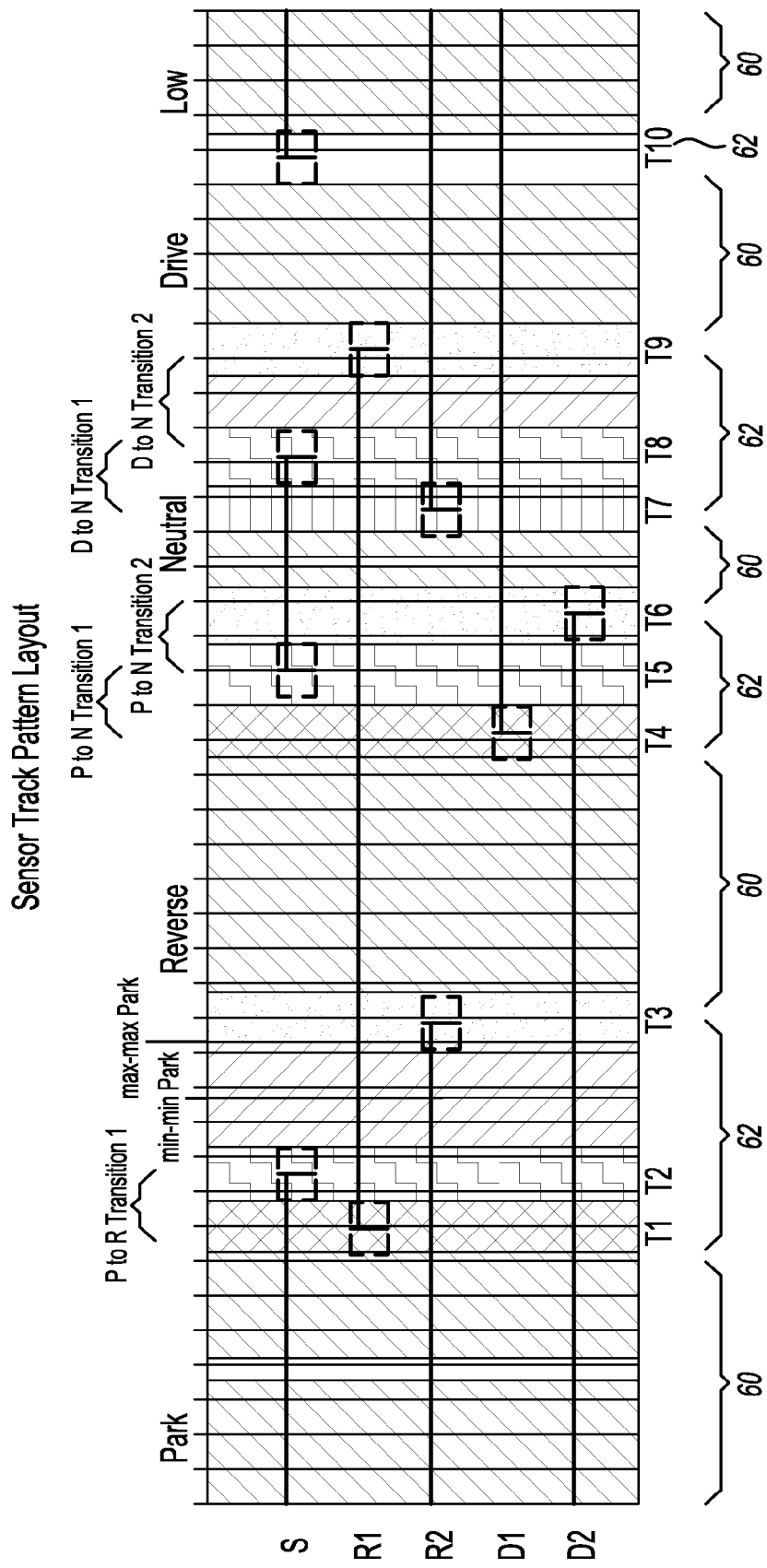
FIG. 3 is an illustration of a sensor track pattern layout for the magnetized track of the internal mode switch illustrated in FIG. 1.

FIG. 3 is an illustration of an exemplary track layout pattern of the magnetized track 54 illustrated in FIG. 2. Specifically, the track layout pattern depicts the magnetic field that is detected by the magnetic field sensors 44 as the detent lever 50 rotates about the axis A-A (FIG. 2). In the embodiment as shown, each of the magnetized elements S, R1, R2, D1 and D2 of the magnetized track 54 are encoded with various north and south polarity segments. The north segments appear black and the south segments are not colored. Each gear selector position of the gear selection assembly 32 is represented by an individual gear selector position magnetic segment 60. For example, in the embodiment as shown the gear selector position Park is represented by a north segment for the magnetic elements S, and R2, and D2, and a south segment for the magnetic elements R1 and D1. The gear selector position Reverse is represented by a north segment for the magnetic elements R1 and D2, and a south segment for the magnetic elements S, R2, and D1. The gear selector position Neutral is represented by a north segment for the magnetic elements S, R1 and D1, and a south segment for the magnetic elements R2 and D2. The gear selector position Drive is represented by a north segment for the magnetic elements R2 and D1, and a south segment for the magnetic elements S, R1 and D2. The gear selector position Low is represented by a north segment for the magnetic elements S, R2 and D1, and a south segment for the magnetic elements R1 and D2.

Each of the magnetized elements 56 of the magnetized track 54 are also encoded with various transitional portions 62 as well. The transitional portions 62 represent when the gear selection assembly 32 is between gear selector positions. In the embodiment as shown, there are four different transitional portions 62. The first transitional portion 62 is when gear selection assembly 32 shifts from the Park position to the Reverse position. In the first transitional portion 62, the magnetic element S is switched from north to south, the magnetic element R1 is switched from south to north, the magnetic element R2 is switched from north to south, the magnetic element D1 remains in a south segment, and the magnetic element D2 remains in a north segment. The second transitional portion 62 is when the gear selection assembly 32 shifts from Neutral position to the Reverse position. In the second transitional portion 62, the magnetic element S is switched from south to north, the element R1 remains in a north segment, the magnetic element R2 remains in a south segment, the magnetic element D1 is switched from south to north, and the magnetic element D2 is switched from north to south. The third transitional portion 62 is when the gear selection assembly 32 shifts from the Neutral position to the Drive position. In the third transitional portion 62, the magnetic element S switches from north to south, the magnetic element R1 is switched from north to south, the magnetic elements R2 and D1 each remain in the north segment, and the magnetic element D2 remains in the south segment. Finally, in the fourth transitional portion 62 the gear selection assembly 32 shifts from the Drive position to the Low position. In the fourth transitional portion 62, the magnetic element S switches from south to north, the magnetic element R1 remains in the south segment, the magnetic elements R2 and D1 remain in the north segment, and the magnetic element D2 remains in the south segment. Although FIG. 3 illustrates the above-mentioned transitional portions 62, those skilled in the art will appreciate that a different number of transitional portions 62 may be used as well.

Referring back to FIG. 2, each of the magnetic field sensors 44 are positioned on the housing 42 of the internal mode switch 32 to detect the magnetic field emitted from the magnetized elements 56. Specifically, each of the magnetic field sensors 44 detect whether the corresponding magnetized element 56 has a north or a south pole depending on the position of the detent lever 50. As the detent lever 50 rotates about the axis A-A, the magnetized track 54 moves back and forth in the direction A or B. Rotation of the detent lever 50 causes the magnetic field detected by the magnetic field sensors 44 to change depending on the position of the magnetic elements 56 in relation to the magnetic field sensors 44. The magnetic field sensors 44 send a data signal to the electrical connector 46 based on the magnetized field detected from the magnetized elements 56. The electrical connector 46 is in communication with and sends the data signals to the control module 40 (FIG. 1). The control module 40 controls the transmission 14 through the control valve 30 (FIG. 1) based on the signals sent from the magnetic field sensors 44.

Figure 4:
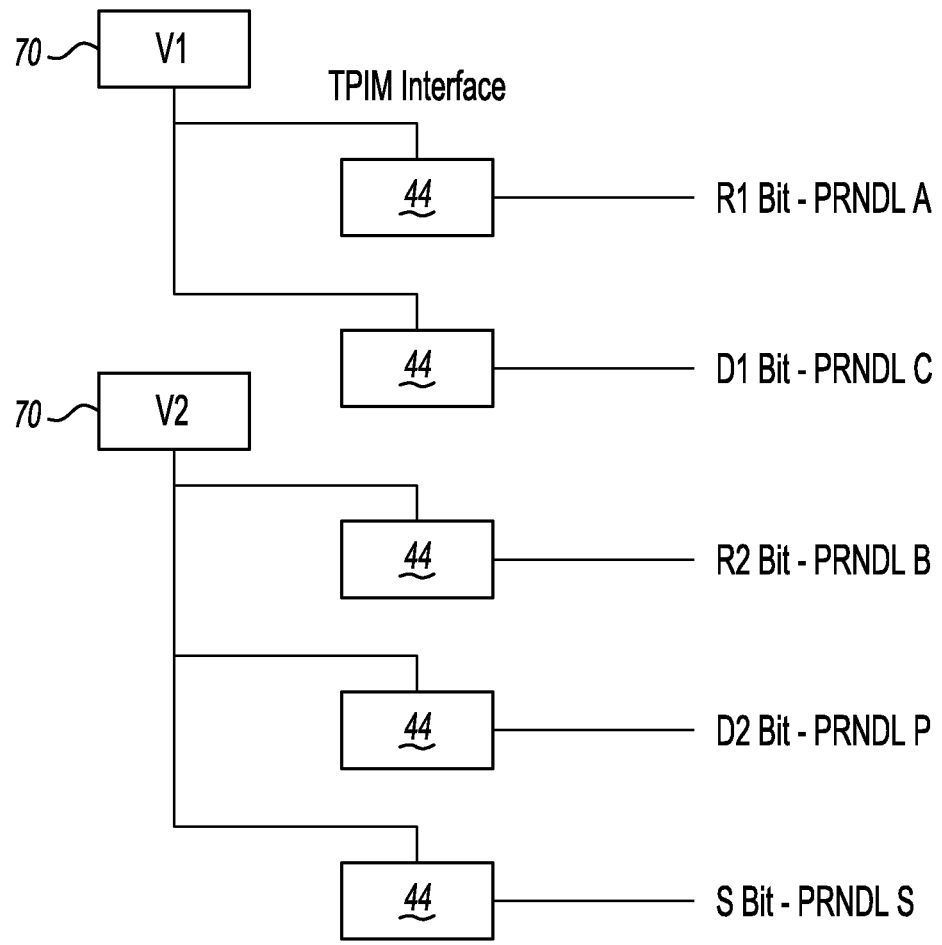
FIG. 4 is a schematic illustration showing the power supply arrangement for the magnetic field sensors illustrated in FIG. 2.

The magnetic field sensors 44 are powered by two different power supplies. Turning now to FIG. 4, a schematic diagram illustrates the power supply allocation between the magnetic field sensors 44 including two unique power supply circuits 70 that are labeled V1 and V2. The magnetic field sensors 44 that correspond to the magnetized elements R1 and D1 of the magnetized track 54 are powered by a first power supply circuit V1. The remaining magnetic field sensors 44 that correspond to the magnetized elements S, R2 and D2 are powered by the second power supply circuit V2. In some other types of gear selector assemblies that are currently available, the magnetic field sensors are all powered by the same power source. In this approach, if the power source fails, then none of the magnetic field sensors will be powered. However, unlike some of the other types of gear selector assemblies that are currently available, if one of the power supply circuits V1 or V2 fail, power is still supplied to at least some of the magnetic field sensors 44.

Figure 5:
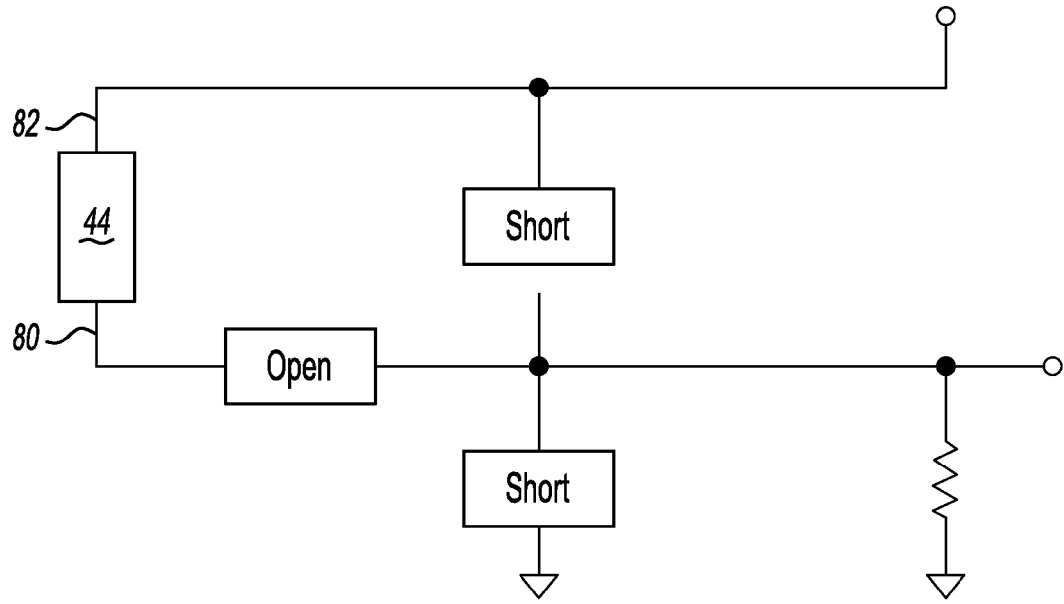
FIG. 5 is a schematic illustration of one of the magnetic field sensors illustrated in FIG. 2.

FIG. 5 is a schematic illustration of one of the magnetic field sensors 44. In the embodiment as shown, the magnetic field sensor 44 is a two lead Hall effect sensor. That is, the magnetic field sensor 44 includes two lead wires 80 and 82. The first lead wire 80 is a signal line that is coupled to the magnetic field sensor 44. The second lead wire 82 is a voltage supply that is coupled to the magnetic field sensor 44. Specifically, the second lead wire 82 supplies the operating current to the magnetic field sensor 44, and also carries the output current that is produced by the magnetic field sensor 44.

The magnetic field sensor 44 produces an output current depending on if the magnetized element 56 of the magnetized track 54 is polarized as a north segment or a south segment (FIGS. 2 and 3). Specifically, if the magnetized element 56 is a south segment, the magnetic field sensor 44 produces a high current value. In one embodiment, the high current value is about fourteen milliamps. If the magnetized element 56 is a north segment, the magnetic field sensor 44 produces a low current value. In one embodiment, the low current value is about six milliamps. If there is an open circuit or a ground fault, then the output current from the second lead wire 80 will be about zero. If there is a short circuit condition, then the output current of the second lead wire 82 will be greater than the high current value, and the magnetic field sensor 44 attempts to regulate the current value to the specified value (i.e., either the high or low current value). Each of the magnetic field sensors 44 are in electrical communication with and send data signals to the electrical connector 46 (FIG. 2). The electrical connector 46 is in electrical communication with and sends data signals indicative of the current values generated by the magnetic field sensors 44 to the control module 40 (FIG. 1).

Figure 6:
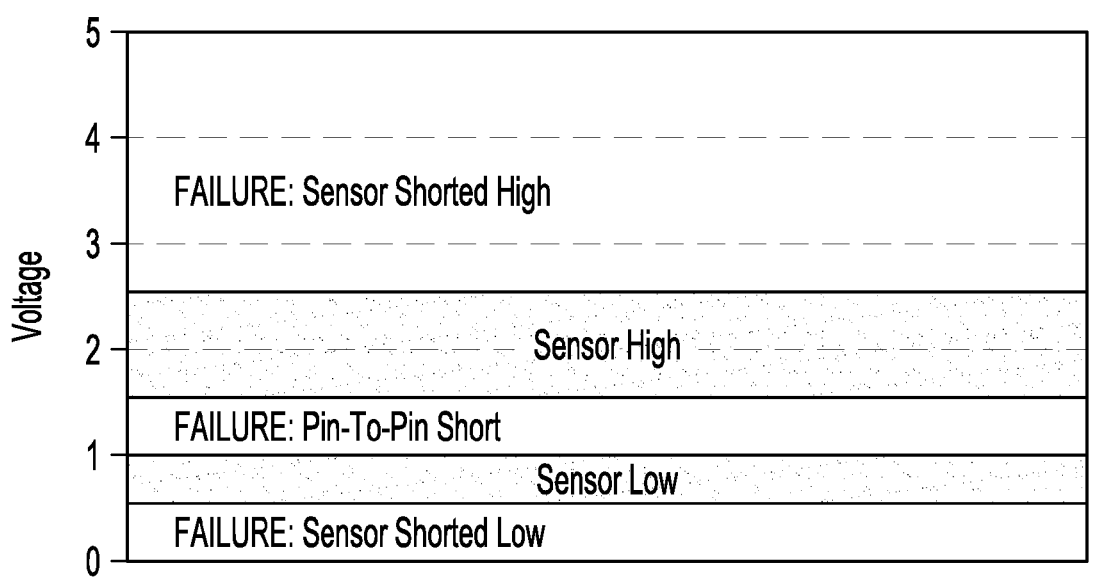
FIG. 6 is an illustration of a chart showing the voltage values that are required to generate either a high bit, a low bit which identify an open circuit or a short circuit of the field magnetic sensor illustrated in FIG. 2.

The control module 40 includes control logic for converting the output current values generated by the magnetic field sensors 44 into voltage values. Specifically, FIG. 6 shows an exemplary chart illustrating how the current values generated by the magnetic field sensors 44 are converted into voltage values. In the embodiment as illustrated, if one of the magnetic field sensors 44 generates an output current value that is about zero or less than the low current value, then there is a failure signal generated by the control module 40 indicating that there is an open circuit or short to ground condition with the particular magnetic field sensor 44. The control module 40 also includes control logic for translating the output voltage to a binary bit pattern. For example, if one of the magnetic field sensors 40 sends a current value that is about the low current value, then the control module 40 generates a voltage signal that indicates a low value. The low value is translated by the control logic to a 1 binary value. If one of the magnetic field sensors 44 sends a current value that is about the high current value, then the control module 40 generates a voltage that indicates a high value. The high value is translated by the control logic to a 0 binary value. Finally, if one of the magnetic field sensors 44 sends a current value that is greater than the high current value, then the control module 40 generates a failure signal indicating that there is a short to power condition with the particular magnetic field sensor 44. Using this approach, the control module 40 is able to determine not only the output current value (i.e. either a high or a low value), but also if there is a short circuit to power, short circuit to ground or an open circuit condition with one of the magnetic field sensors 44.

Turning now to FIG. 7A, an exemplary sensor bit pattern fault analysis chart is illustrated. The bit pattern analysis chart is stored in the memory of the control module 40. The chart illustrates each of the different gear selector positions Park (P), Reverse (R), Neutral (N), Drive (D) and Low (L) under the column named Selector. The column named Transitions Completed describes which particular bit has changed to switch from one gear selector position to another gear selector position. The column named Bit Pattern illustrates the particular bit pattern that is associated with each of the gear selector positions as well as the bit pattern associated with the transitional portions (which are illustrated in FIG. 3), where the transmission 14 shifts between gear positions.

The bit patterns correspond with the output currents that are sent from the magnetic field sensors 44 indicating the polarity of the sensor track layout pattern (shown in FIG. 3). Specifically, referring to FIGS. 1-3, each of the magnetic field sensors S, R1, R2, D1 and D2 generates an output current that is communicated to the control module 40. The north segments of the magnetized track 54 are translated into the binary value 1 by the control module 40, and the south segments are translated into the binary value 0 by the control module 40. The output current of each magnetic field sensor 44 is converted into a bit pattern that is illustrated in FIG. 7A by reference number 90.

The bit patterns associated with each of the magnetic field sensors 44 are created such that a single power failure of one of the power supply circuits can not create an incorrect shift pattern when the transmission 14 is in one of the gear positions. Specifically, FIG. 7B illustrates a complementary bit pattern chart that shows the bits R1, D1, R2 and D2. The bits R1 and D1 correspond to the first power supply circuit V1, and the remaining bits R2 and D2 are powered by the second power supply circuit V2 (FIG. 4). The bits corresponding to the first power supply circuit V1 are complementary to the bits corresponding to the second power supply circuit V2. For example, the Park gear selector position bit pattern is 0011, where the bits R1 and D1 (00) complement the bits R2 and D2 (11). The Reverse gear selector position bit pattern is 1001, where the bits R1 and D1 (10) complement the bits R2 and D2 (01). The Neutral gear selector position bit pattern is 1100, where the bits R1 and D1 (11) complement the bits R2 and D2 (00). The Drive gear selector position bit pattern is 0110, where the bits R1 and D1 (01) complement the bits R2 and D2 (10). Therefore, in the event either the first power supply circuit V1 or the second power supply circuit V2 fails, the bit patterns will not create an incorrect gear selection indication.

Turning back to FIG. 7A, the column named Bit Value is the value of the binary bit pattern. For example, referring to the P gear selector position, the bit pattern 10101 produces the value 21. The column named Indicated is the specified name of the selected bit pattern. For example, the bit pattern 11101 has been labeled as Trans_2. Finally, the column named Predicted refers to the result of error correction control logic that is included with the control module 40. Specifically, the error correction logic is able to correct single bit errors in certain conditions. The code ECC followed by a letter indicates the gear selector position that the error correction logic indicated. For example, the error code ECC_R means that error correction occurred, and the Reverse gear selector position (R) is commanded. However, it should be noted that not all bit patterns are amenable to error correction, either because a unique range can not be determined, or because of other system considerations. In this case, the value Predicted will be set to NP, or no propulsion. The value NP results in the transmission gear selector position being set to Neutral. The value NP should be distinguished from the value ECC_N, where error correction occurs with the Neutral gear selector position commanded.

The error correction logic can occur in two different situations. For example, if there is a known electrical fault with one of the field sensors 44, then the complement of the corresponding bit value will be used as a substitute when error correction logic is used. For example, if the gear selection assembly is in the Neutral gear selector position (where the bit pattern should be 11010), and if the field sensor corresponding to the D2 bit has a known electrical fault meaning the bit pattern is unknown, the error correction logic substitutes the D2 bit with the complement of the D1 bit to produce the Neutral bit pattern of 11010, and the transmission 14 is set to the Neutral gear selector position. If there is an electrical fault with the field sensor 44 corresponding to the S bit, a substitution can not be used, as there is no complementary bit. In this situation, a logical evaluation is made and the set to a 0 binary value if the bits D1 and R1 are identical, and to a 1 binary value if the bits D1 and R1 are different. In another example, if an error occurs such that the bit pattern does not correspond to one of the predefined bit patterns that are in the column named Bit Pattern, this typically means that one of the field sensors 44 can not change current values and is indicating the wrong bit value. If there are no electrical faults detected (such as an open circuit or a short circuit condition with one of the field sensors 44), then another type of error correction logic will be activated. For example, if the bit pattern 00111 is detected, the error correction logic determines that the bit pattern 00111 does not correspond to one of the predefined bit patterns. The error correction logic first evaluates whether the bit pattern 00111 differs from one of the defined bit patterns listed in FIG. 7A by one and only one bit, and corrects the bit pattern 00111 to match one of the predefined bit patterns. In the case where the bit pattern can not match one of the predefined bit patterns by one and only one bit, then the error correction logic will be set to NP, and the transmission 14 is set to a Neutral gear position. In the example as discussed, the bit pattern 00111 differs by one and only one bit from the predefined bit pattern 00110 (which corresponds to the Drive gear selector position), which causes the transmission 14 to go to the Drive position (ECC_D). There are thirty-two possible bit patterns that can occur, where the error correction logic is employed to first evaluate if the bit pattern differs from one of the predefined bit patterns listed in FIG. 7A by one and only one bit. In the case where the bit pattern can not match one of the predefined bit patterns by one and only one bit, then the error correction logic is set to NP and the transmission is set to the Neutral gear position. If the bit pattern differs by one and only one bit from one of the predefined bit patterns, then the error correction logic set the bit pattern to the particular predefined bit pattern, and the transmission 14 is also set to the corresponding gear position.

The gear selector assembly 32 optimizes the number of magnetic field sensors 44 as well as the number of control modules 40 that are used to detect which gear selector position is selected. That is, at least some other types of gear selector assemblies that are currently available use several magnetic field sensors to determine each detent of the detent lever, where each detent corresponds to a gear selector position. These gear selector assemblies also sometimes used two or more control modules. In contrast, the gear selector assembly 32 only has one magnetic field sensor 44 for each detent of the detent lever, as well as only one control module 40 to determine the current gear selector position. The magnetic field sensors 44 are also powered by two different power supplies V1 and V2. Therefore, if one of the power supply circuits fail, power is still supplied to at least some of the magnetic field sensors 44. In one embodiment, the gear selector assembly 32 meets the security requirements of having unintended vehicle direction to occur less than $10^{-8}$ times per hour of operation, and for unintended propulsion to occur less than $10^{-7}$ times per hour of operation, thereby meeting drive-by-wire safety standards.

The description of the invention is merely exemplary in nature and variations that do not depart from the gist of the invention are intended to be within the scope of the invention. Such variations are not to be regarded as a departure from the spirit and scope of the invention.

What is claimed is:

1. A gear selector assembly for selecting a gear position of a transmission, comprising:
    an internal mode switch including a detent lever having a plurality of detents and a magnetized track, wherein the magnetized track includes a plurality of magnetized elements that are indicative a particular gear selector position based on the direction of a magnetic field, and wherein each detent corresponds to one of the gear selector positions and the detent lever is rotatable to select one of the desired gear selector positions;
    a plurality of magnetic field sensors that are associated with each of the magnetized elements for sensing changes in the magnetic field of the magnetized track, where each field sensor corresponds to one of the magnetized elements of the magnetized track, the plurality of magnetic field sensors including at least a first field sensor and a second field sensor;
    a control module in communication with each of the field sensors, wherein each of the field sensors sends an output current to the control module and the value of the output current is variable,
    wherein the first field sensor is configured to produce a first sensor first output current value in a first sensor first current range indicative of a first direction of the magnetic field from the corresponding magnetic track, a first sensor second output current value in a first sensor second current range indicative of a second direction of the magnetic field from the corresponding magnetic track, a first sensor third output current value in a first sensor short current range indicative of a short circuit, and a first sensor fourth output current value in a first sensor open current range indicative of an open circuit, each of the first sensor first current range, the first sensor second current range, the first sensor short current range, and the first sensor open current range not overlapping with each other,
    wherein the second field sensor is configured to produce a second sensor first output current value in a second sensor first current range indicative of a first direction of the magnetic field from the corresponding magnetic track, a second sensor second output current value in a second sensor second current range indicative of a second direction of the magnetic field from the corresponding magnetic track, a second sensor third output current value in a second sensor short current range indicative of a short circuit, and a second sensor fourth output current value in a second sensor open current range indicative of an open circuit, each of the second sensor first current range, the second sensor second current range, the second sensor short current range, and the second sensor open current range not overlapping with each other,
    wherein the control module includes a first control logic for generating a first failure signal indicating an open circuit if the control module receives at least one of the first sensor fourth output current value from the first field sensor and the second sensor fourth output current value from the second field sensor, the control module further including a second control logic for generating a second failure signal indicating a short circuit if the control module receives at least one of the first sensor third output current value from the first field sensor and the second sensor third output current value from the second field sensor; and
    a first power supply and a second power supply that provide power to the field sensors, wherein a portion of the field sensors are powered by the first power supply and the remaining field sensors are powered by the second power supply.

2. The gear selector assembly of claim 1 wherein the control module includes a third control logic for converting the output current values to output voltage values, including:
    a first sensor first output voltage value in a first sensor first voltage range corresponding to the first sensor first output current value, a first sensor second output voltage value in a first sensor second voltage range corresponding to the first sensor second output current value, a first sensor third output voltage value in a first sensor short voltage range corresponding to the first sensor third output current value, and a first sensor fourth output voltage value in a first sensor open voltage range corresponding to the first sensor fourth output current value, each the first sensor first voltage range, the first sensor second voltage range, the first sensor short voltage range, and the first sensor open voltage range not overlapping with each other; and
    a second sensor first output voltage value in a second sensor first voltage range corresponding to the second sensor first output current value, a second sensor second output voltage value in a second sensor second voltage range corresponding to the second sensor second output current value, a second sensor third output voltage value in a second sensor short voltage range corresponding to the second sensor third output current value, and a second sensor fourth output voltage value in a second sensor open voltage range corresponding to the second sensor fourth output current value, each the second sensor first voltage range, the second sensor second voltage range, the second sensor short voltage range, and the second sensor open voltage range not overlapping with each other.

3. The gear selector assembly of claim 2 wherein the control module includes a fourth control logic for translating the output voltage values of each field sensor to a binary bit value, and wherein a bit pattern indicating the gear selector position is created.

4. The gear selector assembly of claim 1 wherein in the event either the first power supply or the second power supply fails, the bit patterns will not create an incorrect gear selection indication.

5. A gear selector assembly for selecting a gear position of a transmission, comprising:
    an internal mode switch including a detent lever having a plurality of detents and a magnetized track, wherein the magnetized track includes a plurality of magnetized elements that are indicative a particular gear selector position based on the direction of a magnetic field, and wherein each detent corresponds to one of the gear selector positions and the detent lever is rotatable to select one of the desired gear selector positions;

a plurality of magnetic field sensors that are associated with each of the magnetized elements for sensing changes in the magnetic field of the magnetized track, where each field sensor corresponds to one of the magnetized elements of the magnetized track, the plurality of magnetic field sensors including at least a first field sensor and a second field sensor;

a control module in communication with each of the field sensors, wherein each of the field sensors sends an output current to the control module and the value of the output current is variable, wherein the first field sensor is configured to produce a first sensor first output current value in a first sensor first current range indicative of a first direction of the magnetic field from the corresponding magnetic track, a first sensor second output current value in a first sensor second current range indicative of a second direction of the magnetic field from the corresponding magnetic track, a first sensor third output current value in a first sensor short current range indicative of a short circuit, and a first sensor fourth output current value in a first sensor open current range indicative of an open circuit, each of the first sensor first current range, the first sensor second current range, the first sensor short current range, and the first sensor open current range not overlapping with each other, wherein the second field sensor is configured to produce a second sensor first output current value in a second sensor first current range indicative of a first direction of the magnetic field from the corresponding magnetic track, a second sensor second output current value in a second sensor second current range indicative of a second direction of the magnetic field from the corresponding magnetic track, a second sensor third output current value in a second sensor short current range indicative of a short circuit, and a second sensor fourth output current value in a second sensor open current range indicative of an open circuit, each of the second sensor first current range, the second sensor second current range, the second sensor short current range, and the second sensor open current range not overlapping with each other, wherein the control module includes a first control logic for generating a first failure signal indicating an open circuit if the control module receives at least one of the first sensor fourth output current value from the first field sensor and the second sensor fourth output current value from the second field sensor, the control module further including a second control logic for generating a second failure signal indicating a short circuit if the control module receives at least one of the first sensor third output current value from the first field sensor and the second sensor third output current value from the second field sensor; and a first power supply and a second power supply that provide power to the field sensors, wherein a portion of the field sensors are powered by the first power supply and the remaining field sensors are powered by the second power supply wherein the control module includes a third control logic for converting the output current values to output voltage values, including:

a first sensor first output voltage value in a first sensor first voltage range corresponding to the first sensor first output current value, a first sensor second output voltage value in a first sensor second voltage range corresponding to the first sensor second output current value, a first sensor third output voltage value in a first sensor short voltage range corresponding to the first sensor third output current value, and a first sensor fourth output voltage value in a first sensor open voltage range corresponding to the first sensor fourth output current value, each the first sensor first voltage range, the first sensor second voltage range, the first sensor short voltage range, and the first sensor open voltage range not overlapping with each other; and a second sensor first output voltage value in a second sensor first voltage range corresponding to the second sensor first output current value, a second sensor second output voltage value in a second sensor second voltage range corresponding to the second sensor second output current value, a second sensor third output voltage value in a second sensor short voltage range corresponding to the second sensor third output current value, and a second sensor fourth output voltage value in a second sensor open voltage range corresponding to the second sensor fourth output current value, each the second sensor first voltage range, the second sensor second voltage range, the second sensor short voltage range, and the second sensor open voltage range not overlapping with each other wherein the control module includes a fourth control logic for translating the output voltage values of each field sensor to a binary bit value, and wherein a bit pattern indicating the gear selector position is created wherein the bit pattern includes five bits that each have a binary value of either 0 or 1, and wherein the five bits are S, R1, R2, D1 and D2 wherein in the event either the first power supply or the second power supply fads the bit patterns will not create an incorrect gear selection indication.

6. The gear selector assembly of claim 5 wherein a complementary bit is substituted if one of the bits corresponds to a field sensor that has a known electrical fault.

7. The gear selector assembly of claim 5 wherein the control module includes an error correction logic and a plurality of predefined bit patterns, and wherein the error correction logic corrects the bit pattern if one and only one of the bits of the bit pattern is different from one of the predefined bit patterns.

8. The gear selector assembly of claim 5 wherein if the value of the output current indicates one of a short circuit and an open circuit for one of the five bits, the control module includes a fifth control logic for substituting the complement of the binary value for the corresponding bit.

9. The gear selector assembly of claim 5 wherein the binary values for the bits R1, D1, R2, and D2 are 0011 respectively for a Park gear selector position.

10. The gear selector assembly of claim 5 wherein the binary values for the bits R1, D1, R2, and D2 are 1001 respectively for a Reverse gear selector position.

11. The gear selector assembly of claim 5 wherein the binary values for the bits R1, D1, R2, and D2 are 1100 respectively for a Neutral gear selector position.

12. The gear selector assembly of claim 5 wherein the binary values for the bits R1, D1, R2, and D2 are 0110 respectively for a Drive gear selector position.

13. A gear selector assembly for selecting a gear position of a transmission, comprising:

an internal mode switch including a detent lever having a plurality of detents and a magnetized track, wherein the magnetized track includes a plurality of magnetized elements that are indicative a particular gear selector position based on the direction of a magnetic field, and wherein each detent corresponds to one of the gear selector positions and the detent lever is rotatable to select one of the desired gear selector positions;

a plurality of magnetic field sensors that are associated with each of the magnetized elements for sensing changes in the magnetic field of the magnetized track, the plurality of magnetic field sensors comprising at least a first field sensor, a second field sensor, a third field sensor, a fourth field sensor, and a fifth field sensor, where each field sensor corresponds to one of the magnetized elements of the magnetized track;

a control module in communication with each of the field sensors, wherein each of the field sensors sends an output current to the control module and the value of the output current is variable, wherein the first field sensor is configured to produce a first sensor first output current value in a first sensor first current range indicative of a first direction of the magnetic field from the corresponding magnetic track, a first sensor second output current value in a first sensor second current range indicative of a second direction of the magnetic field from the corresponding magnetic track, a first sensor third output current value in a first sensor short current range indicative of a short circuit, and a first sensor fourth output current value in a first sensor open current range indicative of an open circuit, each the first sensor first current range, the first sensor second current range, the first sensor short current range, and the first sensor open current range not overlapping with each other, wherein the second field sensor is configured to produce a second sensor first output current value in a second sensor first current range indicative of a first direction of the magnetic field from the corresponding magnetic track, a second sensor second output current value in a second sensor second current range indicative of a second direction of the magnetic field from the corresponding magnetic track, a second sensor third output current value in a second sensor short current range indicative of a short circuit, and a second sensor fourth output current value in a second sensor open current range indicative of an open circuit, each of the second sensor first current range, the second sensor second current range, the second sensor short current range, and the second sensor open current range not overlapping with each other, wherein the third field sensor is configured to produce a third sensor first output current value in a third sensor first current range indicative of a first direction of the magnetic field from the corresponding magnetic track, a third sensor second output current value in a third sensor second current range indicative of a second direction of the magnetic field from the corresponding magnetic track, a third sensor third output current value in a third sensor short current range indicative of a short circuit, and a third sensor fourth output current value in a third sensor open current range indicative of an open circuit, each of the third sensor first current range, the third sensor second current range, the third sensor short current range, and the third sensor open current range not overlapping with each other, wherein the fourth field sensor is configured to produce a fourth sensor first output current value in a fourth sensor first current range indicative of a first direction of the magnetic field from the corresponding magnetic track, a fourth sensor second output current value in a fourth sensor second current range indicative of a second direction of the magnetic field from the corresponding magnetic track, a fourth sensor third output current value in a fourth sensor short current range indicative of a short circuit, and a fourth sensor fourth output current value in a fourth sensor open current range indicative of an open circuit, each of the fourth sensor first current range, the fourth sensor second current range, the fourth sensor short current range, and the fourth sensor open current range not overlapping with each other, wherein the fifth field sensor is configured to produce a fifth sensor first output current value in a fifth sensor first current range indicative of a first direction of the magnetic field from the corresponding magnetic track, a fifth sensor second output current value in a fifth sensor second current range indicative of a second direction of the magnetic field from the corresponding magnetic track, a fifth sensor third output current value in a fifth sensor short current range indicative of a short circuit, and a fifth sensor fourth output current value in a fifth sensor open current range indicative of an open circuit, each of the fifth sensor first current range, the fifth sensor second current range, the fifth sensor short current range, and the fifth sensor open current range not overlapping with each other; and a first power supply and a second power supply that provide power to the field sensors, wherein a portion of the field sensors are powered by the first power supply and the remaining field sensors are powered by the second power supply, wherein the control module includes a first control logic for converting the output current to an output voltage, including a first sensor first output voltage value in a first sensor first voltage range corresponding to the first sensor first output current value, a first sensor second output voltage value in a first sensor second voltage range corresponding to the first sensor second output current value, a first sensor third output voltage value in a first sensor short voltage range corresponding to the first sensor third output current value, and a first sensor fourth output voltage value in a first sensor open voltage range corresponding to the first sensor fourth output current value, each the first sensor first voltage range, the first sensor second voltage range, the first sensor short voltage range, and the first sensor open voltage range not overlapping with each other; a second sensor first output voltage value in a second sensor first voltage range corresponding to the second sensor first output current value, a second sensor second output voltage value in a second sensor second voltage range corresponding to the second sensor second output current value, a second sensor third output voltage value in a second sensor short voltage range corresponding to the second sensor third output current value, and a second sensor fourth output voltage value in a second sensor open voltage range corresponding to the second sensor fourth output current value, each the second sensor first voltage range, the second sensor second voltage range, the second sensor short voltage range, and the second sensor open voltage range not overlapping with each other; a third sensor first output voltage value in a third sensor first voltage range corresponding to the third sensor first output current value, a third sensor second output voltage value in a third sensor second voltage range corresponding to the third sensor second output current value, a third sensor third output voltage value in a third sensor short voltage range corresponding to the third sensor third output current value, and a third sensor fourth output voltage value in a third sensor open voltage range corresponding to the third sensor fourth output current value, each the third sensor first voltage range, the third sensor second voltage range, the third sensor short voltage range, and the third sensor open voltage range not overlapping with each other; a fourth sensor first output voltage value in a fourth sensor first voltage range corresponding to the fourth sensor first output current value, a fourth sensor second output voltage value in a fourth sensor second voltage range corresponding to the fourth sensor second output current value, a fourth sensor third output voltage value in a fourth sensor short voltage range corresponding to the fourth sensor third output current value, and a fourth sensor fourth output voltage value in a fourth sensor open voltage range corresponding to the fourth sensor fourth output current value, each the fourth sensor first voltage range, the fourth sensor second voltage range, the fourth sensor short voltage range, and the fourth sensor open voltage range not overlapping with each other; and a fifth sensor first output voltage value in a fifth sensor first voltage range corresponding to the fifth sensor first output current value, a fifth sensor second output voltage value in a fifth sensor second voltage range corresponding to the fifth sensor second output current value, a fifth sensor third output voltage value in a fifth sensor short voltage range corresponding to the fifth sensor third output current value, and a fifth sensor fourth output voltage value in a fifth sensor open voltage range corresponding to the fifth sensor fourth output current value, each the fifth sensor first voltage range, the fifth sensor second voltage range, the fifth sensor short voltage range, and the fifth sensor open voltage range not overlapping with each other, and wherein the control module includes a second control logic for translating the output voltage to a binary bit pattern that indicates if a particular gear selector position is selected, and the bit pattern includes five bits that each have a binary value of either 0 or 1, and the five bits are S, R1, R2, D1 and D2, the control module further including a third control logic for generating a first failure signal indicating an open circuit if the control module receives the fourth output current value from at least one of the first, second, third, fourth, and fifth field sensors, the control module further including a fourth control logic for generating a second failure signal indicating a short circuit if the control module receives the third output current value from at least one of the first, second, third, fourth, and fifth field sensors.

14. The gear selector assembly of claim 13 wherein if the value of the output current indicates one of a short circuit and an open circuit for one of the five bits, the control module includes a fifth control logic for substituting the complement of the binary value for the corresponding bit.

15. The gear selector assembly of claim 13 wherein in the event either the first power supply or the second power supply fans, the bit patterns will not create an incorrect gear selection indication.

16. The gear selector assembly of claim 15 wherein the field sensors corresponding to the bits R1 and D1 are powered by the first power supply and the field sensors corresponding to the bits S, R2 and D2 are powered by the second power supply.

17. The gear selector assembly of claim 15 wherein the binary values for the bits R1 and D1 are complementary to the binary values for the bits R2 and D2.

18. The gear selector assembly of claim 17 wherein the binary values for the bits R1, D1, R2, and D2 are 0011 respectively for a Park gear selector position.

19. The gear selector assembly of claim 17 wherein the binary values for the bits R1, D1, R2, and D2 are 1001 respectively for a Reverse gear selector position.

20. The gear selector assembly of claim 17 wherein the binary values for the bits R1, D1, R2, and D2 are 1100 respectively for a Neutral gear selector position.

* * * * *